US008586226B2

(12) United States Patent
Hashida

(10) Patent No.: US 8,586,226 B2
(45) Date of Patent: Nov. 19, 2013

(54) BATTERY MODULE WITH UNIT CELL CONNECTOR

(75) Inventor: Osamu Hashida, Nishi-ku (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1505 days.

(21) Appl. No.: 10/572,728

(22) PCT Filed: Oct. 21, 2005

(86) PCT No.: PCT/IB2005/003150
§ 371 (c)(1),
(2), (4) Date: Mar. 21, 2006

(87) PCT Pub. No.: WO2006/043163
PCT Pub. Date: Apr. 27, 2006

(65) Prior Publication Data
US 2008/0248377 A1    Oct. 9, 2008

(30) Foreign Application Priority Data

Oct. 22, 2004  (JP) .................................. 2004-308346
Oct. 17, 2005  (JP) .................................. 2005-301177

(51) Int. Cl.
*H01M 2/00*    (2006.01)
(52) U.S. Cl.
USPC .......................................... 429/99; 429/151
(58) Field of Classification Search
USPC ................. 429/96–100, 149–160, 175–187
See application file for complete search history.

(56) References Cited

U.S. PATENT DOCUMENTS 2,837,593 A * 6/1958 Rueger .......................... 429/174
3,061,662 A   10/1962 Toce et al.
3,844,841 A * 10/1974 Baker ............................. 429/90
4,020,244 A    4/1977 Selinko
5,567,542 A   10/1996 Bae
5,639,257 A *  6/1997 Yamaguchi et al. .......... 439/364
5,674,641 A   10/1997 Cheu
5,871,861 A    2/1999 Hirokou et al.

FOREIGN PATENT DOCUMENTS

| DE | 44 45 738 | | 6/1995 | |
|---|---|---|---|---|
| EP | 0 114 667 | * | 1/1984 | .............. H01M 6/46 |
| EP | 1 059 682 | | 12/2000 | |
| GB | 2 176 929 | * | 1/1987 | .............. H01M 8/46 |
| JP | 2001-229896 | | 8/2001 | |
| JP | 2004-031122 | * | 1/2004 | .............. H01M 2/10 |

OTHER PUBLICATIONS

Machine translation of JP2004-031122.*
Notification of Transmittal of the International Search Report and the Written Opinion of the International Searching Authority dated Apr. 6, 2006, for corresponding International Application No. PCT/IB2005/003150, 11 pages.

* cited by examiner

*Primary Examiner* — Maria J Laios
(74) *Attorney, Agent, or Firm* — Young Basile

(57) ABSTRACT

The invention provides a battery module, which forms an item unit for construction of a battery assembly, comprising a cell unit having a plurality of cells, and a housing and a cover to store the cell unit. The battery module further comprises a shaft member inserted into a through-hole provided in the cell unit and a through-hole provided in the housing and a through-hole provided in the cover, wherein the shaft member comprises a length that allows protrusion from each of the housing and the cover. Furthermore, during construction of the battery module, the shaft member doubles as a jig for insertion of the cover, the cell unit, and the housing in said order for each of the modules within the battery assembly.

17 Claims, 12 Drawing Sheets

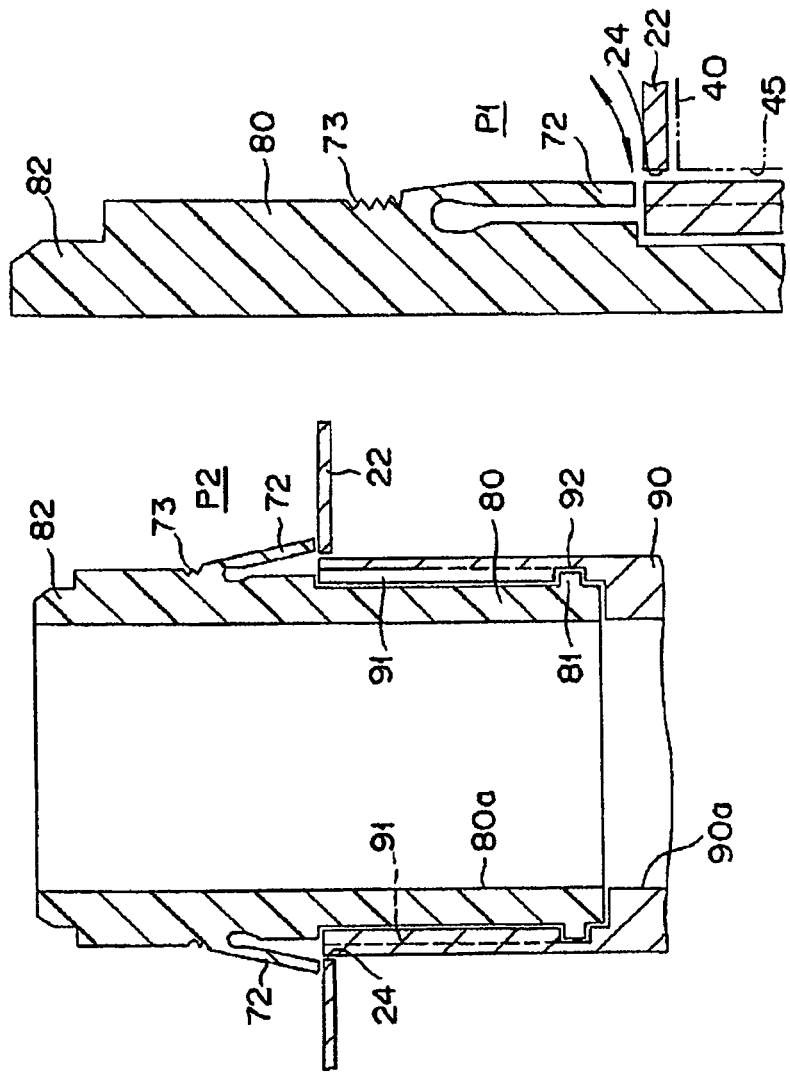

BATTERY MODULE WITH UNIT CELL CONNECTOR

This application is a National Stage filing under 35 USC 371 of International Application No. PCT/IB2005/003150, filed Oct. 21, 2005, which claims priority to Japanese Patent Application No. 2005-301177, filed Oct. 17, 2005, and Japanese Patent Application No. 2004-308346, filed Oct. 22, 2004, the entire contents of each of which is incorporated herein by reference.

TECHNICAL FIELD

The invention pertains to a battery module and to a battery assembly, which is constructed with the aforementioned battery modules.

BACKGROUND

Multiple cells are electrically connected in series and/or in parallel to produce a battery assembly having high output and high capacity. In order to accommodate ease of production, in general, a battery assembly utilizes battery modules where many cells are stored inside a case and used as a module within the battery assembly. In the battery module, multiple cells are connected electrically inside the case and negative and positive output terminals are provided to the outside from the case. Furthermore, based on the output and capacity required, a suitable number of battery modules are connected electrically in series and/or in parallel to produce a battery assembly. Therefore, in an assembly system where individual battery modules are assembled while fastening with screws, a complicated fastening operation is frequently required and may be inconvenient.

SUMMARY

In general, the invention provides a battery module that makes it possible to provide a less complicated battery assembly and to produce a battery assembly that comprises the aforementioned battery modules. Furthermore, in order to simplify construction of the battery assembly, simplification of construction of the battery module itself is an aspect of the invention.

In one embodiment, a battery module, which forms an item unit for construction of a battery assembly, comprises a cell unit having a plurality of cells, and a housing and a cover to store the cell unit. The battery module further comprises a shaft member inserted into a through-hole provided in the cell unit and a through-hole provided in the housing and a through-hole provided in the cover, wherein the shaft member comprises a length that allows protrusion from each of the housing and the cover.

In another embodiment, a battery assembly comprises a plurality of battery modules wherein an axis of a first shaft member of a first battery module and an axis of a second shaft member of a second battery module are matched at the time of connecting the second shaft member along the axis direction as the first shaft member is fitted at an interfitting member of the second shaft member. The plurality of battery modules are stacked where each battery module's interfitting member of a shaft member are locked, and a support structure that supports the battery modules from both sides of the plurality of battery modules when each of the battery module's interfitting members are locked.

In another embodiment, a method of manufacturing a battery module comprises storing a cell unit, which contains a plurality of battery cells, within a housing having a cover to form a storage space and inserting a shaft member into a through-hole provided in the cell unit and a through-hole provided in the cover and a through-hole provided in the housing. The shaft member comprises a length that allows protrusion from each of the cover and the housing. The method further comprises fastening a fastening member to the cover at an area where the shaft member protrudes from the cover, locking a locking member to the housing at an area where the shaft member protrudes from the housing, such that the lock member is free to move between a first position where insertion into the through-hole of the cell unit and the through-holes of each of the cover and housing is allowed and a second position where separation of the cell units and each of the cover and housing from the shaft member is prevented, and inserting the cover, the cell unit, and the housing in said order onto the shaft member from the lock member side toward the fastening member, wherein the shaft member doubles as a jig.

In another embodiment, a method of manufacturing a battery assembly comprises matching an axis of a first shaft member of a first battery module and an axis of a second shaft member of a second battery module at the time of connecting the second shaft member along the axis direction as the first shaft member is fitted at an interfitting member of the second shaft member. The method further comprises stacking a plurality of battery modules where each battery module's interfitting member of the shaft member are locked, and inserting the plurality of battery modules into a support structure that supports the battery modules from both sides of the plurality of battery modules when each of the battery module's interfitting members are locked.

In another embodiment, a battery module, which forms an item unit for construction of a battery assembly, comprises means for enclosing a plurality of cells, a shaft member inserted into a through-hole provided in a cell unit and a through-hole provided in the enclosing means, wherein the shaft member comprises a length that allows protrusion from the enclosing means. The battery module further comprises means for locking the shaft member to the housing or to the cover.

BRIEF DESCRIPTION OF DRAWINGS

FIG. 9(A) and FIG. 9(B) are cross-section views of the main unit of the shaft member.

DETAILED DESCRIPTION

Figure 1:
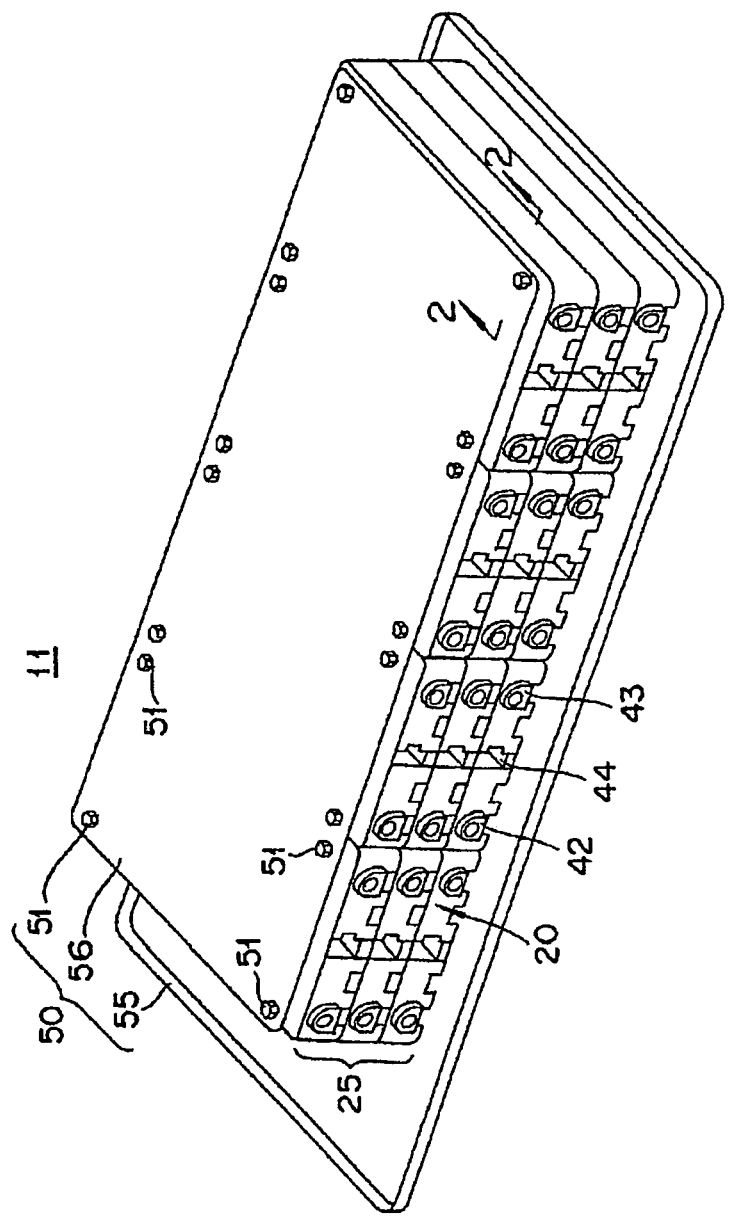
FIG. 1 is a perspective view of a schematic structure of a battery assembly of an embodiment of the present invention.
Figure 2:
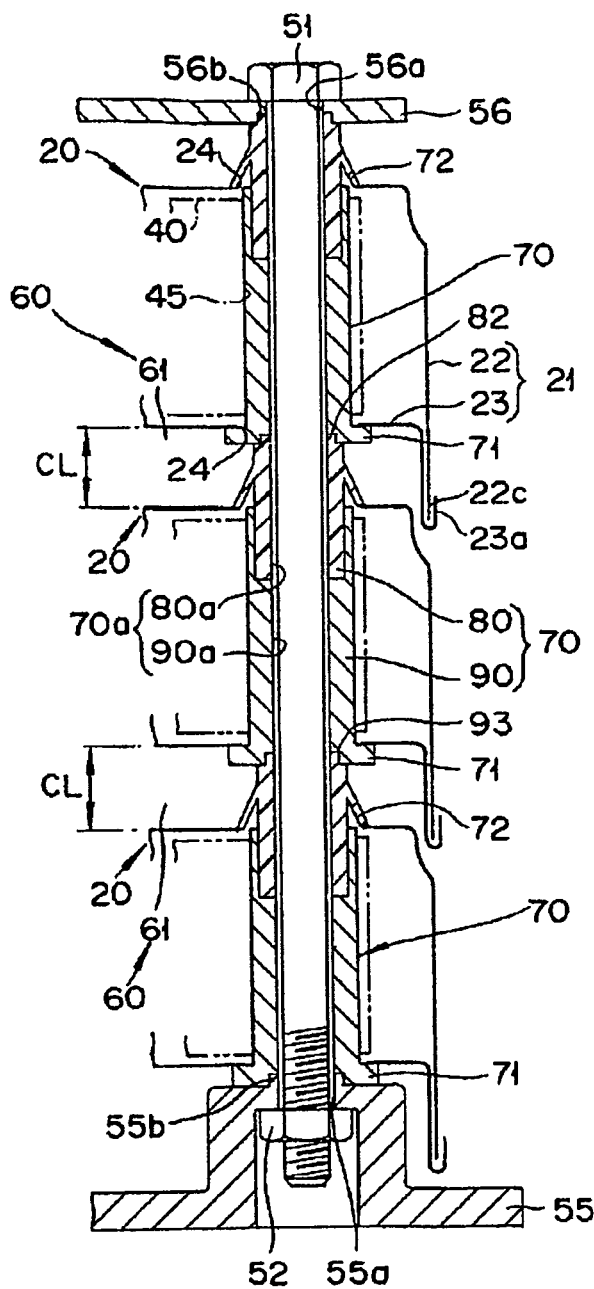
FIG. 2 is a schematic cross-section view at line 2-2 of FIG. 1.

As shown in FIG. 1 and FIG. 2, battery assembly 11 is constructed with each of battery modules 20 as an individual unit, which are arranged as groups of battery modules 25. Multiple of battery modules 20 are stacked with space 60 and support means 50 that support the group of battery modules 25. When a given number of battery modules 20 are connected in series and/or in parallel, battery assembly 11 providing the desired current, voltage and capacity is formed. An exemplary embodiment of battery assembly 11 (also referred to as an "assembled battery") includes twelve battery modules 20. In FIG. 1, twelve battery modules 20 are arranged horizontally in four rows of three stacked vertically.

In one embodiment, battery module 20 is an air-cooled type and the gaps 60 between battery modules 20 are used as cooling air passages 61 for cool air to flow down for cooling each battery module 20. Cool air flowing into each battery module 20 is cooled to reduce the battery temperature and to prevent deterioration of the properties such as charging efficiency. Though it is not shown in FIG. 1 and FIG. 2, an appropriate connection member, such as a bus bar, is used for connection of battery modules 20 in series or in parallel. Battery assembly 11 may be installed in automobiles, trains or other vehicles. Support member 50 and assembly of battery assembly 11 are explained in detail below.

It should be noted that a battery module is a type of assembled battery from the standpoint of having multiple cells connected electrically but in the present specification, a battery module is used as a component for assembly of a "battery assembly" (such as battery assembly 11). A "battery module" (such as battery module 20) refers to multiple cells contained inside a case.

Battery module 20 is explained briefly using FIG. 3-FIG. 10 as references. Battery module 20 has a cell unit 40 containing many flat cells 30, housing 22, and cover 23. Housing 22 and cover 23 form a module case 21 for holding cell units 40. Cell unit 40 contains through-holes 45. Housing 22 and cover 23 contain through-holes 24. Battery module 20 also contains a shaft member 70 that is inserted into through-holes 24 and through holes 45 and has a length that extends beyond each of the housing 22 and cover 23. For the portion where shaft member 70 protrudes from cover 23, a fastening member 71 is locked to cover 23. For the portion where shaft member 70 protrudes from housing 22, a lock member 72 is locked to housing 22. Lock member 72 is constructed so that it is free to move between first position P1 (FIG. 9) where insertion to the through-hole 45 of the cell unit 40 and to the through-hole 24 of each of housing 22 and cover 23 is allowed and a second position P2 (FIG. 9) where separation of the cell unit 40 and housing 22 and cover 23 from the shaft member is prevented. Shaft member 70 doubles as a jig for insertion of cover 23, cell unit 40, and housing 22 in said order from lock member 72 in the direction of fastening member 71 at the time of assembly of battery module 20 (See FIG. 10). The invention is explained in further detail below.

Figure 3:
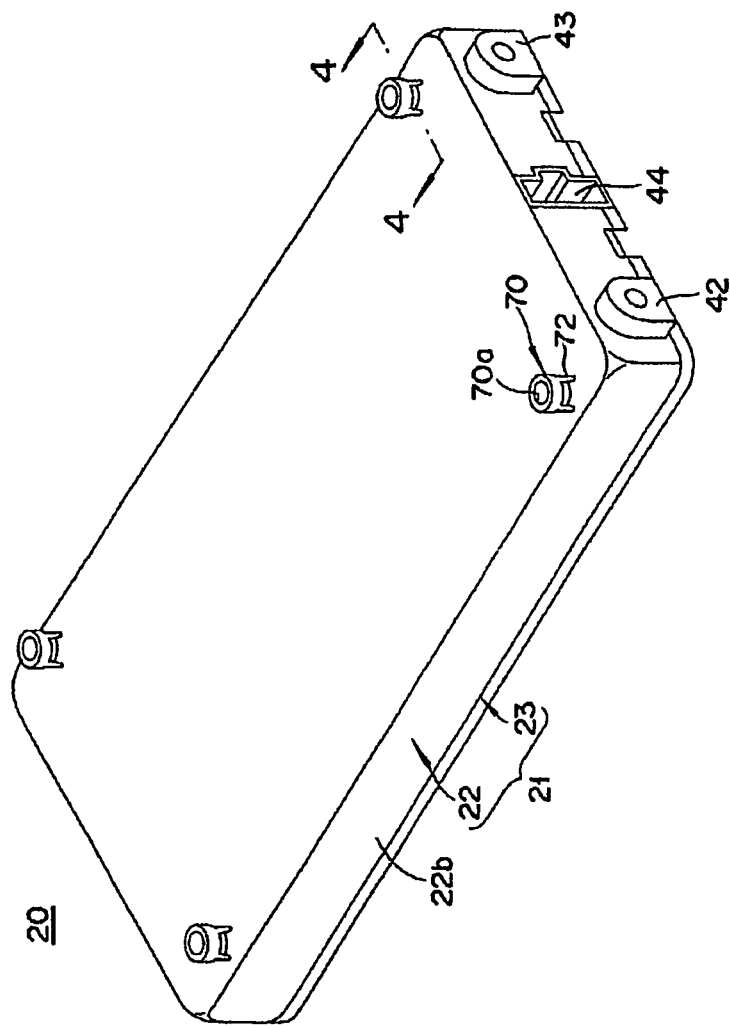
FIG. 3 is a perspective view of an example of battery module.
Figure 4:
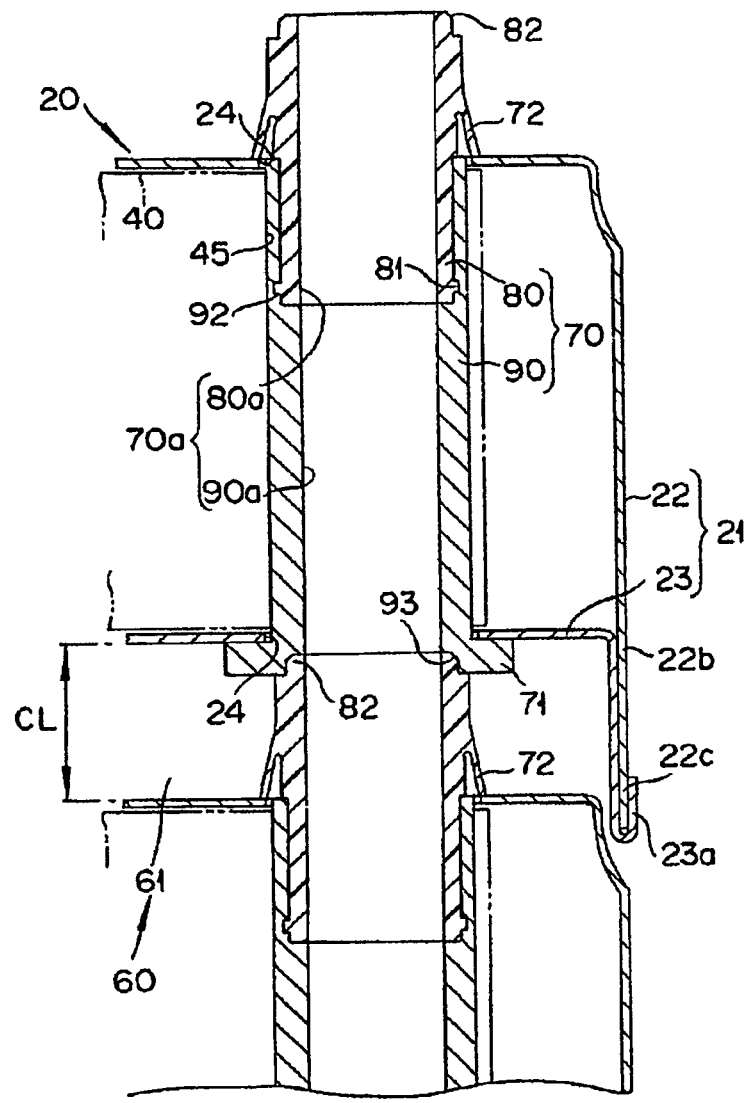
FIG. 4 is a cross-section view at line 4-4 of FIG. 3 and shows the main unit of the group of battery modules comprising a multilayer stack of battery modules.
Figure 5:
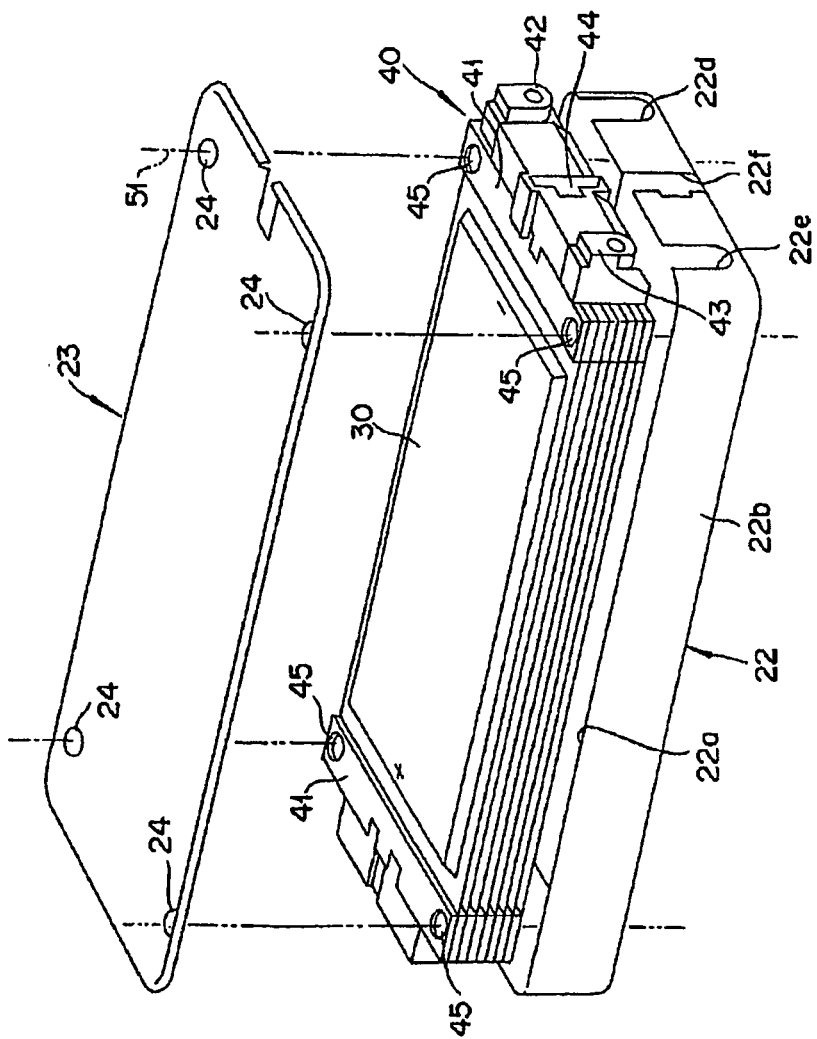
FIG. 5 is a perspective view of an exploded view of upside-down battery module shown in FIG. 3.

In FIG. 3-FIG. 5, module case 21 used for storage of cell unit 40 comprises box-shaped housing 22 provided with opening 22a (FIG. 5) and cover 23 that forms a lid for opening 22a. Cover 23 and housing 22 are mutually locked as an edge member of one of the cases is rolled in over an edge member of the other case. In other words, edge member 23a of cover 23 is rolled in over the edge member 22c on the wall 22b of housing 22 by a self-locking process (see FIG. 4 for reference).

Housing 22 and cover 23 may be made of a relatively thin sheet steel or sheet aluminum and are a pre-determined shape that may be provided by press molding. Inside module case 21, cell unit 40 comprises multiple flat cells 30 (eight cells shown in the FIG. 5) that are connected in series. Cell unit 40 also includes insulating spacer 41 used for retention of electrode tabs 31 and 32 of flat cell 30 and positive and negative electrode terminals 42 and 43. Positive and negative electrode terminals 42 and 43 are fed through to the outside from module case 21 through notch members 22d and 22e provided in an area of wall 22b of housing 22.

In FIG. 5, item 44 indicates the entry for a connector (not shown in the FIG. 5) connected to a voltage detection terminal (not shown in the FIG. 5) of each flat cell 30. Entry 44 is exposed to the outside through notch member 22f of the module case 21 provided in a portion of wall 22b, as well. For insertion of shaft member 70, through-holes 24 are provided at the four corners of housing 22 and through-holes 45 are provided at two locations of each insulation spacer 41.

Figure 6:
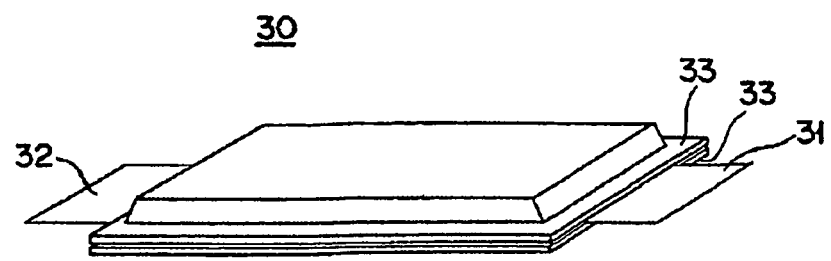
FIG. 6 is a perspective view of an exemplary flat cell.
Figure 7:
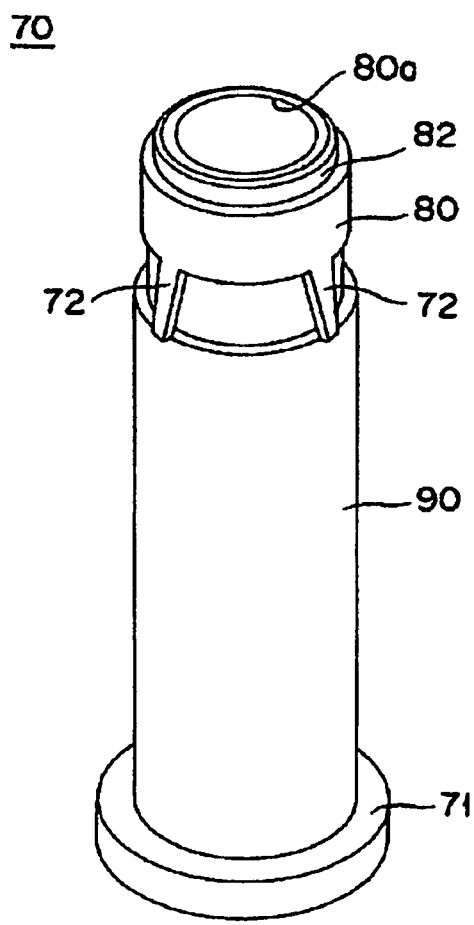
FIG. 7 is perspective view of the shaft member included in the battery module.

In FIG. 6, flat cell 30 is, for example, a lithium ion secondary battery, and a laminated power element (not shown in FIG. 6) where a positive plate, negative plate and separator are laminated in said order and shielded with a sheath material 33. One end of flat cells 30 is electrically connected with the power element and sheet-like electrode tabs 31 and 32 lead out from sheath material 33. Electrode tabs 31 and 32 extend to both sides in the longitudinal direction (horizontally in FIG. 6) of flat cell 30. In a flat cell 30 having a laminated type power element, it is necessary to apply pressure to the power element to compress the power element in order to maintain the distance between electrodes and to maintain battery performance. Therefore, each flat cell 30 is stored inside module case 21 in a manner that compresses the power element.

In FIG. 4 and FIG. 7-FIG. 9, the shaft member 70 of the aforementioned embodiment has locator 80 formed by center hole 80a and sleeve 90 formed by center hole 90a and the aforementioned two are connected. Shaft member 70 has a hollow structure formed by center hole 70a (generic name for center holes 80a and 90a).

Locator 80 and sleeve 90 have an outer diameter smaller than the inner diameter of through-hole 45 of cell unit 40 and through-hole 24 of cover 23 and housing 22, and shaft member 70 can be inserted into through-holes 24 and 45. The length of each locator 80 and sleeve 90 is set in such a manner that the locator 80 protrudes from the housing 22 and the sleeve 90 protrudes from the cover 23 in the assembled state of the battery module 20. The material used for the locator 80 and sleeve 90 is not especially limited and in the example shown in the figure, locator 80 is made of a resin material and sleeve 90 is made of a metal material. As shown in an enlarged view of FIG. 9(A), an opening is provided for receiving the base end of locator 80 at center hole 90a of sleeve 90. On the inner surface of the opening, a vertical channel 91 extends along the axis direction of the shaft member 70, from the upper edge downward (FIG. 9A), and a circular channel 92 extends in the peripheral direction. Circular channel 92 is formed at an angle of 90 degrees, for example. Meanwhile, a projection 81 having a size to be fitted to vertical channel 91 and circular channel 92 is formed at the base end of the outer surface of locator 80. The key structure comprises vertical channel 91, circular channel 92, and projection 81. Furthermore, when locator 80 is inserted into sleeve 90, projection 81 follows vertical channel 91 and when locator 80 is rotated 90 degrees, for example, projection 81 follows circular channel 92, thus, the connection state of locator 80 and sleeve 90 can be set.

Fastening member 71 is located at the position where shaft member 70 protrudes from cover 23, that is, sleeve 90. An exemplary embodiment of fastening member 71 is shown in the FIGS. 4 and 7 as having a flange shape having a greater outer diameter than the inner diameter of through-holes 24 and 45. When the upper surface of fastening member 71 comes in contact with the lower surface of cover 23, fastening member 71 is locked to cover (FIG. 4).

Lock member 72 is located on the portion of the shaft member 70 that protrudes from housing 22, that is, locator 80. An exemplary embodiment of lock member 72, shown in the FIGS. 4, 7-9, has a claw-shape or umbrella-shape that opens with a descending slope from the outer surface of locator 80 toward the outer direction of the diameter and fastening member 71. When the end member of lock member 72 comes in contact with the upper surface of housing 22, lock member 72 is locked to the housing 22 (see FIG. 4 and FIG. 9A). As shown in FIGS. 9A-9B, claw-shaped lock member 72 has a structure that is free to move between the first position P1 where insertion into through-hole 45 of cell unit 40 and into through-hole 24 of housing 22 and cover 23 is allowed and a second position P2 where separation of cell unit 40, housing 22, and cover 23 from shaft member 70 is prevented.

In the exemplary embodiment, lock member 72 has a claw shape made of a resin material and is elastic. Furthermore, lock member 72 opens with a descending slope in the radial direction and engages fastening member 71. Therefore, when cover 23, cell unit 40, or housing 22 is inserted onto shaft member 70 from lock member 72 toward the direction of fastening member 71, the end member of the lock member 72 is pressed toward the inner side of the outer surface of locator 80 or toward the direction of the axis of the shaft member 70 as it is being guided by the inner surface of the through-holes 24 and 45, and reaches the first position P1 (FIG. 9B). Furthermore, when through-holes 24 and 45 pass through the lock member 72, lock member 72 opens based on its elasticity and is restored to the second position P2 (FIG. 9A). In other words, in this exemplary embodiment, lock member 72 is free to move between first position P1 and the second position P2 as the lock member undergoes elastic distortion toward the axis of shaft member 70.

As shown in FIG. 9A and FIG. 9B, accordion channel 73 may be provided near the base end of lock member 72 in order to achieve smooth movement of lock member 72. Furthermore, in order to ensure return of lock member 72 to second position P2, an elastic component such as a flat spring, spring, or rubber may be provided between the outer surface of locator 80 and lock member 72 and an elastic force may be applied for moving lock member 72 toward the second position P2.

Figure 8B:
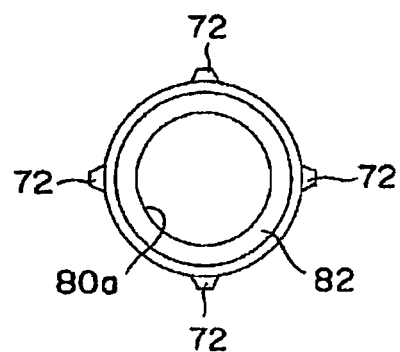
FIG. 8(A) and FIG. 8(B) are a vertical cross-section view and top view of shaft member.
Figure 8A:
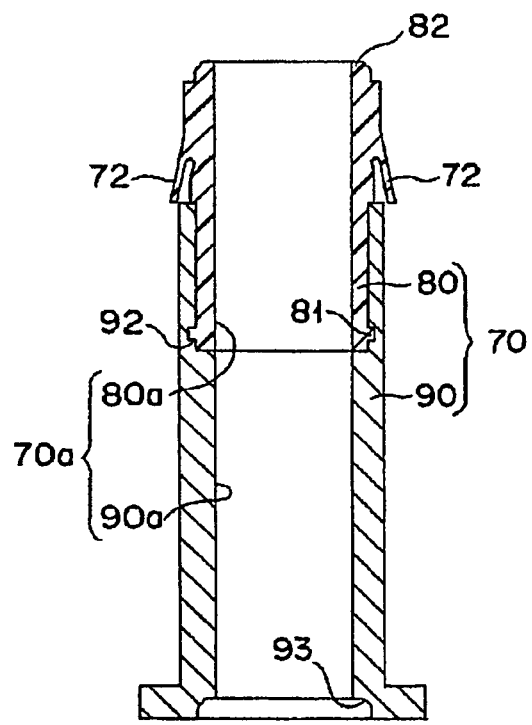

As shown in FIG. 4 and FIG. 8, interfitting members are provided at both end faces of shaft member 70 in the axis direction so that the axis of shaft member 70 and the axis of another shaft member 70 can be matched at the time of connecting the shaft members with the end faces mutually fitted together. In specific terms, a projection 82 is formed on the end face of locator 80 of shaft member 70 and a recessed member 93, having a shape corresponding to projection 82, is formed on the end face of sleeve 90. And interfitting member comprises projection 82 and recessed member 93.

Figure 10:
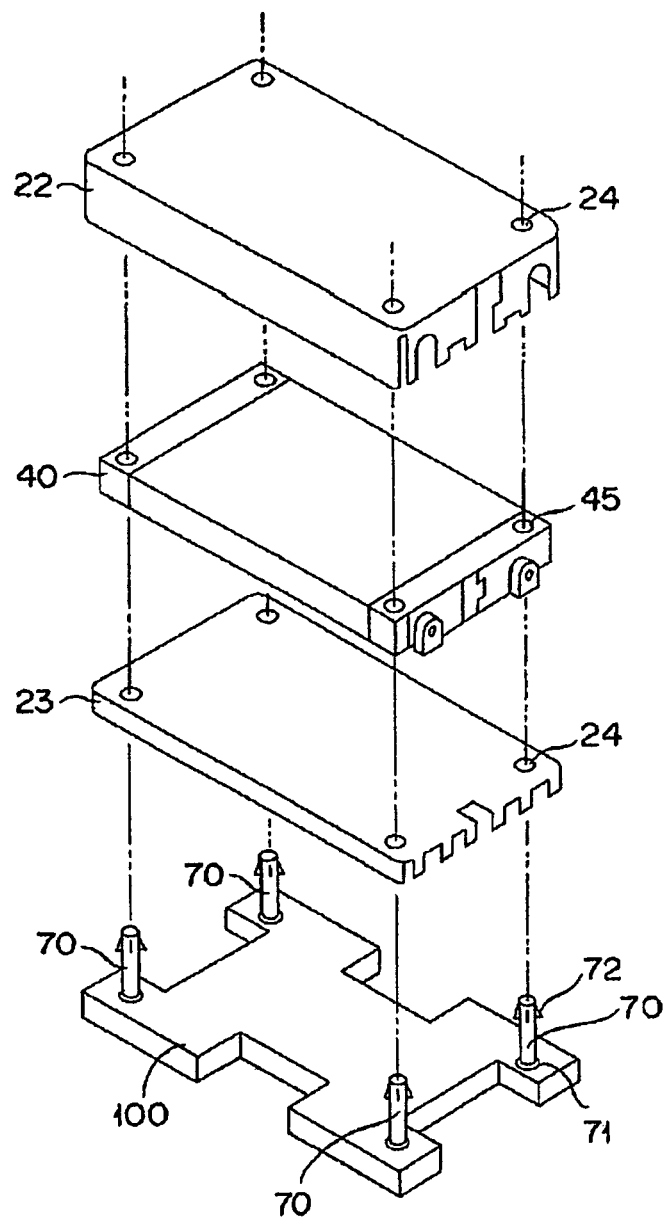
FIG. 10 is a perspective view of the shaft member used as a jig at the time of assembly of the battery module.

FIG. 10 illustrates an exemplary assembling procedure for battery module 20. First, shaft member 70 is held on jig base 100. A recessed member having a shape corresponding to the shape of the fastening member 71 provided at the lower end of sleeve 90 is formed on the upper surface of jig base 100. And a magnetic device (not shown in FIG. 10) for pulling in the metal sleeve 90 is arranged underneath jig base 100. When the magnetic device is operated and sleeve 90 is pulled in, shaft member 70 is securely stabilized on jig base 100.

Subsequently, cover 23 is inserted onto shaft member 70. At this time, the leading end member of lock member 72 undergoes elastic distortion toward the first position P1 (FIG. 9B) as it is being guided by the inner surface of through-hole 24. In this case, it is possible for through-hole 24 to pass through lock member 72. When through-hole 24 passes through lock member 72, lock member 72 opens based on its elasticity and returns to the second position P2 (FIG. 9A).

Furthermore, cell unit 40 is inserted onto shaft member 70. In this case also, the leading end member of the lock member 72 undergoes elastic distortion toward the first position P1 (FIG. 9B) as it is being guided by the inner surface of through-hole 45. In this case, it is possible for through-hole 45 to pass through lock member 72. When through-hole 45 passes through lock member 72, the lock member 72 opens based on its elasticity and returns to the second position P2 (FIG. 9A).

Furthermore, housing 22 is inserted to shaft member 70. In this case also, the leading end member of lock member 72 undergoes elastic distortion toward the first position P1 (FIG. 9B) as being guided by the inner surface of through-hole 24. In this case, it is possible for through-hole 24 to pass through lock member 72. When through-hole 24 passes through lock member 72, the lock member 72 opens based on its elasticity and returns to second position P2 (FIG. 9A). In this case, lock member 72 is locked to housing 22 and separation of cell unit 40 and each of housing 22 and cover 23 from the shaft member 70 can be prevented. Moreover, when separation of housing 22 is prevented, surface pressure is applied to cell unit 40. And as a result, power element of flat cell 30 can be adequately suppressed and retention of battery performance can be achieved.

Subsequently, edge member 23a of the cover 23 is rolled in at edge member 22a of housing 22 by a caulking device not shown in the figures so as to mutually seal cover 23 and housing 22.

When operation of the magnetic device is stopped and battery module 20 is removed from jig base 100, the assembly process of battery module 20 is completed.

Figure 12:
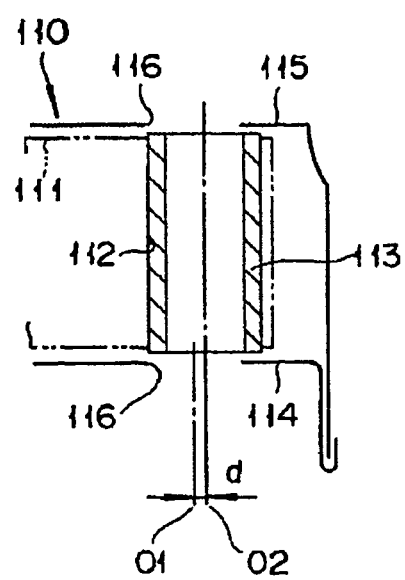
FIG. 12 is a cross-section view of the main area of battery module of a comparison example where the sleeve alone is inserted into the through-hole of the cell unit.

FIG. 12 is a cross-section view that shows the main unit of a battery module 110 of a comparison example where sleeve 113 is inserted only into through-hole 112 of cell unit 111.

Upon assembling battery modules 111 of a comparison example, pins are inserted into the jig base 100 shown in FIG. 10, and cover 114, sleeve 113, cell unit 111, and housing 115 are sequentially inserted onto the pins in said order and caulking is provided. In this procedure, through-hole 116 undergoes deformation and the pin bites into them when cover 114 and housing 115 undergo deformation at the time of caulking, and removal of assembled battery module 110 from the assembling jig is difficult. Furthermore, when sleeve 113 alone is inserted to the through-hole 112 of cell unit 111, shearing /d/ is likely to form between the center O1 of the through-hole 116 of each cover 114 and housing 115 and the center O2 of the sleeve 113 in an assembled battery module 110 and stability of the accurate positioning of cover 114, housing 115 and sleeve 113 is difficult.

On the other hand, in the present embodiment of the present invention, shaft member 70 doubles as a jig for insertion of cover 23, cell unit 40, and housing 22 sequentially from the side of lock member 72 toward the side of the fastening member 71 in said order at the time of assembly of battery module 20. Therefore, removal of battery module 20 from the assembly jig can be done easily after assembly even when deformation of housing 22 and cover 23 occur at the time of the caulking process. Furthermore, in battery module 20 after assembly, shaft member 70 penetrates housing 22 and cover 23; thus, shearing is less likely to occur between the center of through-hole 24 and the center of the shaft member 70 and positioning accuracy of housing 22 and cover 23 can be easily stabilized.

Furthermore, battery assembly 11 is explained in detail below. In this case, FIG. 1, FIG. 2, and FIG. 4 are used as references. Battery assembly 11 is constructed with a plurality of groups of battery modules 25 where multiple battery modules 20 are stacked as interfitting members (recessed member 93 and projection member 82) of shaft member 70 are fitted together with support means 50 (that supports group of battery modules 25) as shaft member 70 where interfitting members are mutually fitted are held from both sides of the group of battery modules 25.

The shaft member 70 of the present embodiment has a hollow structure having center hole 70a and support means 50 includes fastening bolt 51 inserted into the center hole 70a of the shaft member 70.

A constructing procedure of battery assembly 11 is explained in detail below. It should be noted that the uppermost battery module 20 is referred to as battery module A, the center battery module 20 is referred to as battery module B, and the lower-most battery module 20 is referred to as battery module C to simplify the explanation.

First, battery module C, the lower-most module, is arranged on base member 55. Base member 55 is contains through-holes 55a for insertion of fastening bolts 51 and projections 55b having a shape corresponding to the recessed member 93 of shaft member 70. The recessed member 93 of shaft member 70 is fitted to the projection 55b on base member 55. In this case, battery module C is arranged on base member 55 in a positioned state.

Subsequently, battery module B, the middle battery module, is arranged on battery module C. At this time, recessed member 93 of the shaft member 70 of battery module B is fitted to the projection member 82 of the shaft member 70 of battery module C. In this case, battery module B is arranged on battery module C in a positioned state.

Furthermore, battery module A, the upper-most battery module, is arranged on battery module B. At this time, recessed member 93 of the shaft member 70 of battery module A is fitted to the projection member 82 of the shaft member 70 of battery module B. In this case, battery module A is arranged on battery module B under positioned state.

When stacking of each battery module C, B, and A is achieved while fitting the interfitting members (recessed members 93 and projection members 82) of shaft member 70, production of a group of battery modules 25 where individual battery modules C, B, and A are mutually positioned can be easily achieved.

Furthermore, a top member 56 is arranged on battery module A. Top member 56 contains through-hole 56a for insertion of fastening bolt 51 and recessed member 56b having a shape corresponding to projection member 82 of shaft member 70. The recessed member 56b of top member 56 is fitted to the projection member 82 of shaft member 70 of battery module A. In this case, top member 56 is arranged on battery module A in a positioned state.

And furthermore, fastening bolt 51 is inserted into through-hole 55a of base member 55, center hole 70a of three shaft members 70 connected together, and through-hole 56a of top member 56 and fastening bolt 51 is secured with nut 52. In this manner, shaft member 70 mutually fitted at the interfitting member is held from both sides of the group of battery modules 25, and group of battery modules 25 is retained. Each group of battery modules 25 is fastened at four corners (FIG. 1). In the present embodiment, support means 50 that holds group of battery modules 25, is formed by base member 55, top member 56, and fastening bolt 51.

As shown in FIG. 2 and FIG. 4, a clearance CL of the space between battery modules 20 is regulated by shaft member 70 based on mutual fitting of the interfitting members. Clearance CL between battery modules 20 varies depending on the layout of the vehicle and the dimensions required for function of the cool air passages 61, but in general, it is several millimeters.

Figure 13:
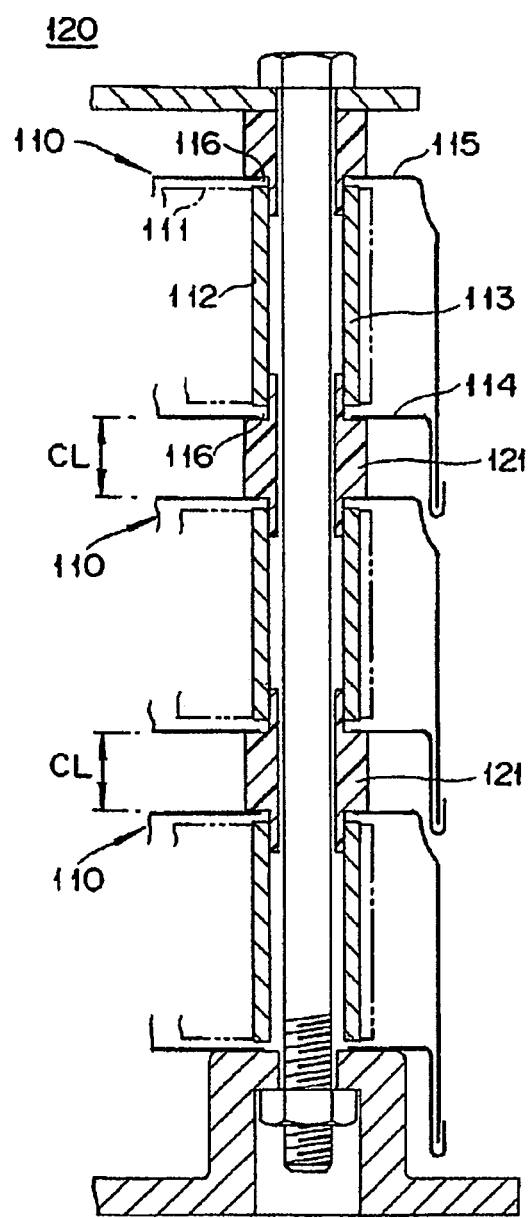
FIG. 13 is a cross-section view of the main area of a battery assembly of a comparison example constructed with the battery module shown in FIG. 12.

FIG. 13 is a cross-section view of the main area of battery assembly 120 of a comparison example assembled with battery module 110 shown in FIG. 12. When battery assembly 120 is made from battery modules 110 shown in FIG. 12, it is necessary to insert cylindrical collars 121 between the battery modules 110 for regulating clearance CL of the space between battery modules 110. However, the number of collars 121 is high and the work requires significant time. Furthermore, in battery module 110 of the comparison example, positioning accuracy of case 114 and case 115 and sleeve 113 is not stable as explained above, therefore, smooth insertion of the aforementioned collars 121 onto sleeves 113 cannot be achieved and is inconvenient.

On the other hand, in the present embodiment of the invention, the clearance between battery modules 20 is regulated by shaft member 70 where interfitting members are mutually fitted. The portion of shaft member 70 extending outside of housing 22 and cover 23 functions as a collar; thus, insertion of a collar, which is a separate component, between battery modules 20 is not required. Therefore, the attachment process of the collar is eliminated and assembling of battery assembly 11 can be simplified. Furthermore, the number of parts is reduced and production of a cost-effective battery assembly 11 is made possible.

As explained above, according to the aforementioned embodiment, production of battery module 20 with simplified construction of a battery assembly is made possible and battery assembly 11, comprising multiple battery modules 20, can be constructed.

Figure 11B:
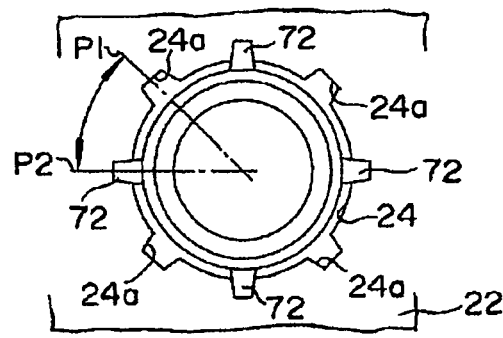
FIGS. 11(A) and 11(B) are a vertical cross-section view and a top view of a battery module used for an explanation of a modified example of a shaft member.
Figure 11A:
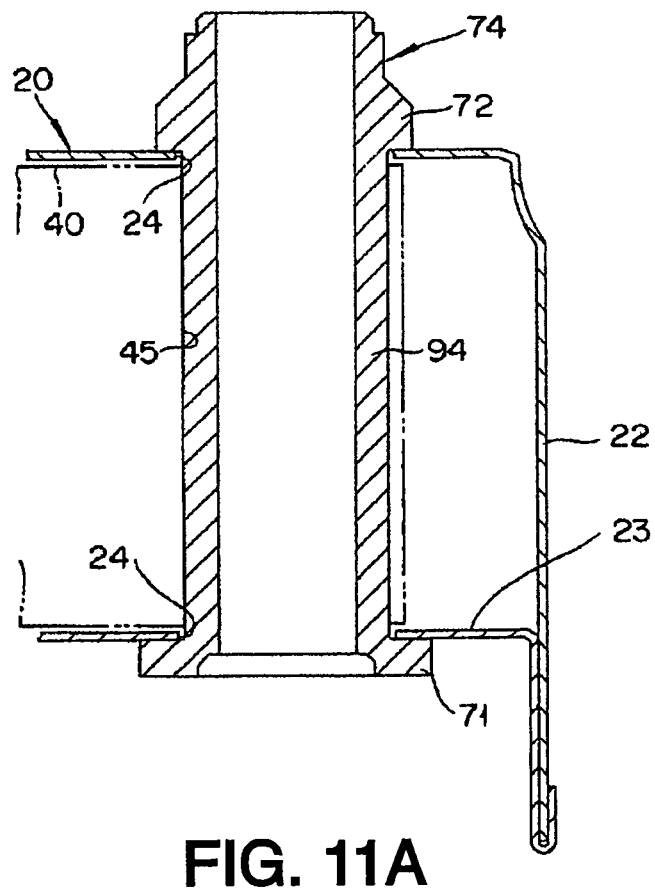

Modified Example of Shaft Member:

FIG. 11A and FIG. 11B are a vertical cross-section view and a top view of battery module 20 used for explanation of a modified example 74 of the shaft member. Lock member 72 is not limited to the structure of the aforementioned embodiment where the lock member is free to move between first position P1 and second position P2 based on elastic displacement as long as the structure is free to move between the first position P1 and the second position P2, and for example, lock member 72 may be free to move between the first position P1 and the second position P2 through rotation with the axis of the shaft member as the center of rotation. In specific terms, as shown in FIG. 11A and FIG. 11B, shaft member 74 comprising a metal sleeve 94 and a rib-shaped lock member 72 that extends from the outer surface of sleeve 94 outward surface is formed integrally. Notch member 24a through which lock member 72 can be inserted is provided for the through-hole 24 matching the phase of the aforementioned lock member 72. In the example shown in the FIG. 4, lock members 72 are provided at intervals of 90 degrees and 4 notch members 24a are provided at 90 degree intervals corresponding to the lock members. Similar notches are provided for the through-hole 45 of cell unit 40 as well. The position where the lock member 72 and notch member 24a match corresponds to the first position P1 and the position where the axis of the shaft member 74 is rotated 45 degrees with the axis of shaft member 74 as the center corresponds to the second position P2.

In assembling of the aforementioned battery module 20, after inserting housing 22 onto shaft member 74 and lock member 72 is rotated 45 degrees with the axis of shaft member 74 as the center, lock member 72 is locked to the housing 22 and separation of cell unit 40, housing 22, and cover 23 from the shaft member 74 can be prevented.

In the aforementioned examples, a case where shaft members 70 and 74 have a hollow structure is shown, but the present invention is not limited to the aforementioned examples. Upon assembly of battery module 20, shaft member doubles as a jig for insertion of each housing 22, cover 23, and cell unit 40, and it is not necessary to have a hollow structure. Furthermore, it is not necessary for the shaft member to have a hollow structure upon constructing battery assembly 11 as long as connection is made possible by fitting of interfitting members. Therefore, the shaft member may be a solid material. In this case, the support means 50 used has a structure where base member 55 and top member 56 are fastened by a fastening bolt provided at a different position from that of the shaft member. The shaft member with interfitting member mutually fitted is held from both sides of the group of battery modules 25 with the fastened base member 55 and top member 56, and battery modules 25 are supported.

In the above-mentioned examples, lock member 72 alone has a structure that is free to move, but the lock member may be a structure that is free to move between the first position P1 and the second position P2 in the present invention, but a structure that is free to move may be provided between the first position P1 and the second position P2 with a fastening member as well. In this case, insertion of housing 22 and cover 23 onto the shaft member inserted onto cell unit 40 ahead of time is made possible simultaneously from both ends.

According to the invention described above, the shaft member doubles as a jig at the time of assembling of the battery module; thus, removal of the battery module after assembly from the assembling jig can be done easily even when the case undergoes deformation. Furthermore, the shaft member extends beyond the case after assembly of the aforementioned battery module; thus, shearing is less likely to occur between the center of the through-hole and the center of the shaft member and positional accuracy of the case and the shaft can be easily stabilized. Furthermore, formation of a battery module arrangement where battery modules are mutually positioned can be easily achieved as many battery modules are stacked while interfitting members of the shaft member are fitted together. Moreover, when stacking is done while the interfitting members of the shaft member are fitted together, a gap is formed between battery modules; thus, provision of a separate component to form the aforementioned gap, for example, insertion of a collar between battery modules is not required. Therefore, the collar attachment process can be eliminated and construction of battery assembly can be simplified. Furthermore, the number of components can be reduced, thus, a cost effective battery assembly can be produced.

Various embodiments of the invention have been described. These and other embodiments are within the scope of the following claims.

The invention claimed is:

1. A battery module, which forms an item unit for construction of a battery assembly, comprising:
   a cell unit having a plurality of cells;
   a housing and a cover to store the cell unit; and
   a shaft member configured to receive a bolt there through, the shaft member inserted into a through-hole provided in the cover and further through a through-hole provided in the cell unit and further through a through-hole provided in the housing, wherein the shaft member comprises a length that allows protrusion beyond the housing and a lock member provided at an area where the shaft member protrudes beyond an outer surface of the housing and configured to lock the shaft member to the housing, wherein the lock member has a structure that is free to move between a first position where insertion of the lock member into the through-hole of the cell unit and into the through-holes of the housing and the cover is allowed and a second position where separation of the cell unit and the housing and the cover from the shaft member is prevented.

2. The battery module of claim 1, wherein the shaft member further comprises a fastening member provided at an area where the shaft member protrudes beyond an outer surface of the cover, wherein the fastening member is fastened to the cover.

3. The battery module of claim 2, wherein the fastening member is a flange having a greater diameter than the diameter of the through-hole provided in the cover.

4. The battery module of claim 2, wherein the shaft member doubles as a jig for insertion of the cover, the cell unit, and the housing in said order from the fastening member toward the lock member at the time of assembly of the battery module.

5. The battery module of claim 1, wherein the lock member is free to move between a first position and a second position as the lock member undergoes elastic displacement in the direction of an axis of the shaft member.

6. The battery module of claim 1, wherein the lock member is free to move between the first position and second position as the lock member undergoes rotation with an axis of the shaft member as the center.

7. The battery module of claim 1, wherein an edge of the housing is mutually locked into a rolled edge of the cover to form a seam between the housing and the cover.

8. A method of manufacturing a battery module, which forms an item unit for construction of a battery assembly, comprising:
   storing a cell unit, which contains a plurality of cells, within a housing having a cover to form a storage space;
   inserting a shaft member configured to receive a bolt there through into a through-hole provided in the cover and further through a through-hole provided in the cell unit and further through a through-hole provided in the housing, wherein the shaft member comprises a length that allows protrusion beyond the housing, a fastening member and a lock member;
   fastening the fastening member to the cover at an area where the shaft member protrudes beyond an outer surface of the cover;
   locking the lock member to the housing at an area where the shaft member protrudes beyond an outer surface of the housing, such that the lock member is free to move between a first position where insertion the lock member into the through-hole of the cell unit and the through-holes of each of the cover and housing is allowed and a second position where separation of the cell unit and each of the cover and housing from the shaft member is prevented; and inserting the cover, the cell unit, and the housing in said order onto the shaft member from the fastening member toward the lock member, wherein the shaft member doubles as a jig.

9. The method of claim 8, further comprising mutually locking the housing into a rolled edge of the cover to form a seam between the housing and the cover.

10. A battery module, which forms an item unit for construction of a battery assembly, comprising:
a cell unit having a plurality of cells;
a housing and a cover to store the cell unit; and
a shaft member inserted into a through-hole provided in the cell unit and a through-hole provided in the housing and a through-hole provided in the cover;
wherein the shaft member comprises a length that allows protrusion from at least the housing;
wherein the shaft member is a first shaft member of a first module, further comprising an interfitting member formed on both end faces of the first shaft member in the axis direction; and
wherein the axis of the first shaft member and an axis of a second shaft member of a second battery module are matched at the time of connecting the second shaft member along the axis direction as the first shaft member is fitted at an interfitting member of the second shaft member.

11. The battery module of claim 10,
wherein the battery module is formed into a battery module arrangement comprising a plurality of battery modules by stacking the battery modules where the interfitting members of the shaft members are locked; and
wherein a support structure supports the battery modules from both sides of the battery module arrangement when the shaft members with locked interfitting members are locked, thereby forming the battery assembly.

12. The battery module of claim 11, wherein the shaft members regulate a gap between the battery module and a second battery module when the interfitting members are in a fitted state.

13. The battery module of claim 11, wherein the shaft members are hollow and wherein a center hole is the through-hole and the support structure includes a fastening bolt.

14. A method of manufacturing a battery assembly comprising:
providing a plurality of battery modules, wherein a first battery module has a first shaft member that extends from at least the housing of the first battery module, wherein the first shaft member comprises an interfitting member formed on at least one end face of the first shaft member, and wherein additional battery modules each have an additional shaft member that extends from at least the housing of the additional battery module, wherein the additional shaft members each comprise an interfitting member formed on at least one end face of the additional shaft member;
matching an axis of the first shaft member of the first battery module with an axis of an additional shaft member of the additional battery modules at the time of connecting the additional shaft member along the axis direction, the first shaft member fitted at an interfitting member of the additional shaft member;
stacking the plurality of battery modules where each battery module's interfitting member of the shaft member are locked; and
inserting the plurality of battery modules into a support structure that supports the battery modules from both sides of the plurality of battery modules when each of the battery module's interfitting members are locked.

15. The method of claim 14, further comprising regulating a gap between the battery modules with the shaft members when the interfitting members are in a fitted state.

16. The method of claim 14, further comprising fastening a fastening bolt to the shaft member.

17. A battery module, which forms an item unit for construction of a battery assembly, comprising: means for enclosing a plurality of cells; and a shaft member configured to receive a bolt there through, the shaft member inserted into a through-hole provided in the plurality of cells and a through-hole provided in the enclosing means, wherein the shaft member comprises a length that allows protrusion beyond the enclosing means; wherein the shaft member comprises means for locking the shaft member to the means for enclosing the plurality of cells, the means for locking including a first position during insertion and a second position during locking.

* * * * *